C. H. WEGNER.
FENDER.
APPLICATION FILED FEB. 13, 1912.

1,046,917.

Patented Dec. 10, 1912.

Witnesses
W. S. McDowell
John J. McCarthy

Inventor
C. H. Wegner
By Victor J. Evans
Attorney

UNITED STATES PATENT OFFICE.

CHARLES H. WEGNER, OF BALTIMORE, MARYLAND, ASSIGNOR OF ONE-THIRD TO HENRY F. SLEEPACK AND ONE-THIRD TO AMELIA C. WEGNER, OF BALTIMORE, MARYLAND.

FENDER.

1,046,917.      Specification of Letters Patent.      Patented Dec. 10, 1912.

Application filed February 13, 1912. Serial No. 677,329.

*To all whom it may concern:*

Be it known that I, CHARLES H. WEGNER, a citizen of the United States of America, residing in the city of Baltimore and State of Maryland, have invented new and useful Improvements in Fenders, of which the following is a specification.

This invention relates to improvements in fenders and has particular application to fenders for use on self-propelled vehicles, such as automobiles and the like.

In carrying out my invention, it is my purpose to provide a fender which shall be constructed in such manner as to enable the same to be attached to the forward axle and mud guards of the vehicle so as to present a stable and secure structure whereby a person struck by such fender may be caught and held thereon without injury.

Furthermore, I aim to provide a fender which may be folded to facilitate storing of the vehicle.

It is also my purpose to provide a fender which shall embody the desired features of simplicity, efficiency and durability and which may be manufactured and marketed at a relatively low cost.

With the above and other objects in view, the invention consists in the construction, combination and arrangement of parts hereinafter set forth in and falling within the scope of the appended claims.

Figure 1:
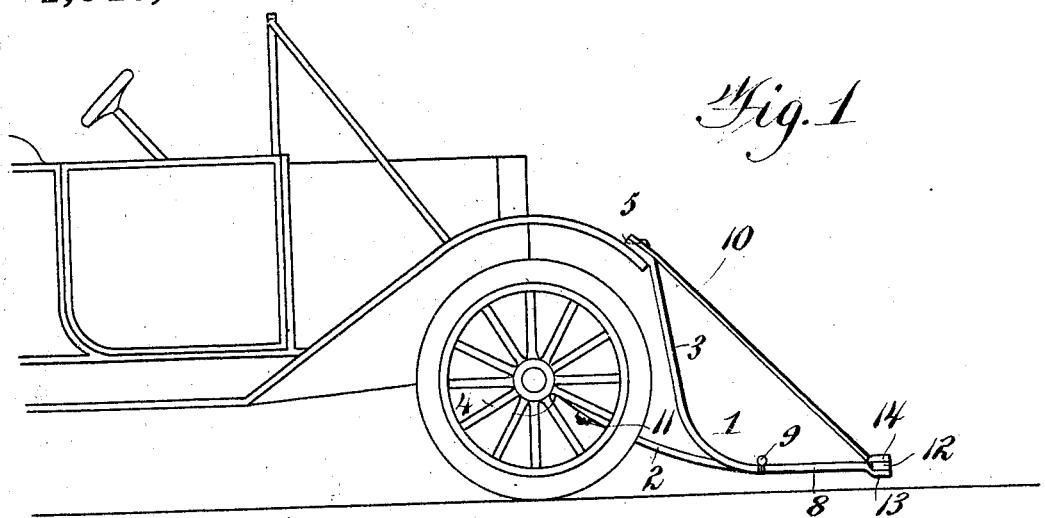
Figure 2:
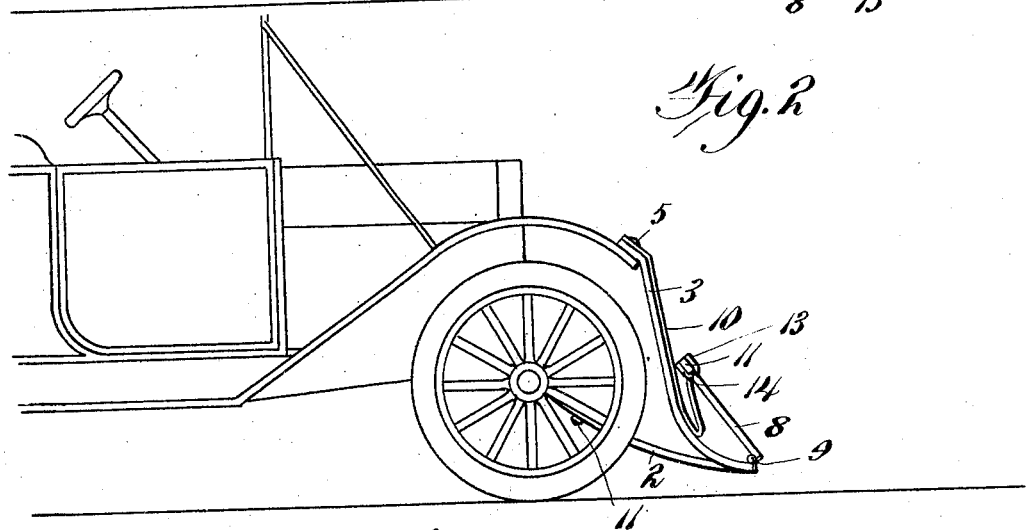
Figure 3:
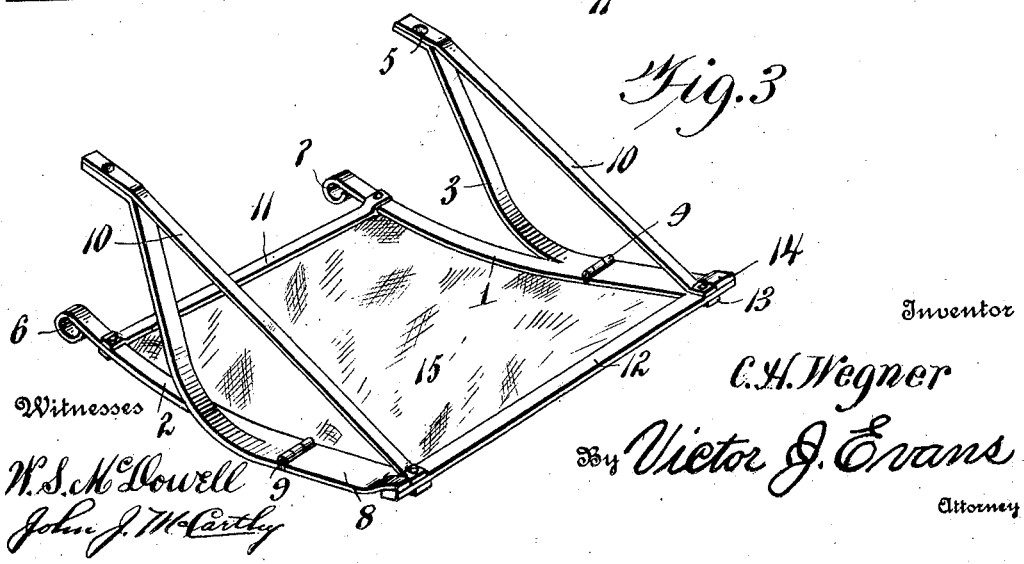

In the accompanying drawing forming a part of this specification; Figure 1 is a fragmentary side elevation of a motor vehicle equipped with a fender constructed in accordance with the present invention. Fig. 2 is a similar view showing the fender in its folded position, and Fig. 3 is a detail perspective view of the fender detached from the vehicle.

Similar reference characters designate like parts throughout the several views.

Referring now to the drawing in detail, my improved fender includes a pair of spaced parallel supporting bars 1, each having one extremity bifurcated to provide relatively long limbs 2 and 3, said limbs being disposed in different planes and the lower limb 2 is connected to the forward axle of the vehicle, as at 4, while the upper limb 3 is connected to the forward portion of the mud guards as at 5, bolts or other suitable fastening devices being employed to fasten the limb to the mud guards, the lower limb having its free extremity turned upon itself to form an eye 6 for the purpose of receiving the front axle. Each supporting bar, as illustrated, is composed of two sections 7 and 8 hingedly connected as at 9 in advance of the limbs 2 and 3 so that the forward sections of the members may be folded upwardly and against the limb 3 thereof when it is desired to store the vehicle or when the same is not in use. A pair of flexible straps 10 constructed of leather or the like are also fastened to the forward ends of the mud guards and to the free extremities of the forward sections 8 of the supporting members so that the latter may be securely held in operative or fender forming position, the end of the straps permitting folding of the supporting members as above set forth.

Interconnecting the supporting bars 1 immediately in advance of the forward axle of the vehicle, is a cross bar 11 having its opposite ends bifurcated and bolted or otherwise secured to the lower limbs 2 of the bifurcated portions of the supporting bars, while a second cross bar 12 connects the similar extremities of the forward section 8 of the supporting bars, these extremities of the section 8 being also bifurcated to provide upper and lower spring tongues 13 and 14 respectively by means of which the cross bar 12 may be clamped to the supporting bars. It will thus be seen that a substantially square opening is formed by means of the cross bars 11 and 12 and the portions of the supporting bars 1 intermediate said cross bars, the cross bars and supporting bars forming the walls of such opening. To these walls is fastened in any suitable manner a flexible covering 15 constructed of canvas or the like and designed to receive a person when struck by the forward cross bar 12 of the fender.

From the above description taken in connection with the accompanying drawing, the construction and mode of operation of the present invention will be readily understood and while I have herein shown and described one form of my invention, by way of illustration, I desire to have it understood that I do not limit myself to all of the details of construction herein described and delineated as modification and variation may be made without exceeding the scope of the appended claims.

I claim:

1. The combination with a vehicle, of a fender comprising spaced parallel supporting bars having bifurcated portions forming limbs connected to the axle and mud guards of the vehicle, respectively, a cross bar interconnecting the limbs connected to the axle in advance of the axle, a second cross bar, and a flexible covering carried by said supporting bars and cross bars.

2. The combination with a vehicle, of a fender comprising spaced parallel supporting bars having bifurcated portions forming limbs connected to the axle and mud guards of the vehicle, respectively, said supporting bars comprising hingedly connected sections whereby the fender may be folded, a cross bar interconnecting the limbs connected to the axle forwardly of the axle, a second cross bar interconnecting said supporting bars at the forward extremities thereof, and a flexible covering carried by said supporting bars and cross bars.

3. The combination with a vehicle, of a fender comprising spaced parallel supporting bars having bifurcated portions forming limbs connected to the axle and mud guards of the vehicle, respectively, said supporting bars comprising hingedly connected sections whereby the fender may be folded, a cross bar interconnecting the limbs connected to the axle forwardly of such axle, a second cross bar interconnecting said supporting bars at the forward extremities thereof, and flexible straps connecting the forward extremities of said supporting bars and the mud guards.

4. The combination with a vehicle, of a fender comprising spaced parallel supporting bars, connections between said bars and mud guards and axle of the vehicle, respectively, a cross bar interconnecting said supporting bars forwardly of the axle, a second cross bar interconnecting said supporting bars at the forward extremities thereof and forming with the first-mentioned cross bar and supporting bars a square opening, and a flexible covering carried by said supporting bars and cross bars for said opening.

In testimony whereof I affix my signature in presence of two witnesses.

CHARLES H. WEGNER.

Witnesses:
 HENRY F. SLEPACK,
 AMELIA C. WEGNER.

---

Copies of this patent may be obtained for five cents each, by addressing the "Commissioner of Patents, Washington, D. C."